United States Patent [19]

Tsuboyama et al.

[11] Patent Number: 4,783,148
[45] Date of Patent: Nov. 8, 1988

[54] FERROELECTRIC LIQUID CRYSTAL DEVICE

[75] Inventors: Akira Tsuboyama, Segamihara; Toshiharu Uchimi; Kenji Shinjo, both of Atsugi, all of Japan

[73] Assignee: Canon Kabushiki Kaisha, Tokyo, Japan

[21] Appl. No.: 98,318

[22] Filed: Sep. 18, 1987

[30] Foreign Application Priority Data

Sep. 20, 1986 [JP] Japan ............................. 61-222709

[51] Int. Cl.⁴ ............................................ G02F 1/133
[52] U.S. Cl. ................................. 350/341; 350/350 S
[58] Field of Search ........................... 350/350 S, 341

[56] References Cited

U.S. PATENT DOCUMENTS

| | | | |
|---|---|---|---|
| 4,128,313 | 12/1978 | Cole et al. | 350/341 |
| 4,472,028 | 9/1984 | Ooue et al. | 350/341 |
| 4,561,720 | 12/1985 | Goodby et al. | 350/350 S |
| 4,633,012 | 12/1986 | Taguchi et al. | 350/350 S |
| 4,639,089 | 1/1987 | Okada et al. | 350/350 S X |
| 4,714,323 | 12/1987 | Katagiri et al. | 350/350 S |
| 4,720,173 | 1/1988 | Okada et al. | 350/341 |
| 4,721,367 | 1/1988 | Yoshinaga et al. | 350/341 X |
| 4,744,636 | 5/1988 | Tsuboyama | 350/341 X |

Primary Examiner—Stanley D. Miller
Assistant Examiner—David Lewis
Attorney, Agent, or Firm—Fitzpatrick, Cella, Harper & Scinto

[57] ABSTRACT

A ferroelectric liquid crystal device is by disposing between a pair of substrates a ferroelectric liquid crystal composition showing a phase transition series of isotropic→chiral nematic phase (N*)→chiral smectic C phase on temperature decrease. The alignment state of the liquid crystal is improved by forming alignment control films of mutually different materials on the pair of substrates. The alignment state is improved especially when the liquid crystal composition is formulated to show a helical pitch in N* phase which exceeds three times the spacing between the pair of substrates.

11 Claims, 5 Drawing Sheets

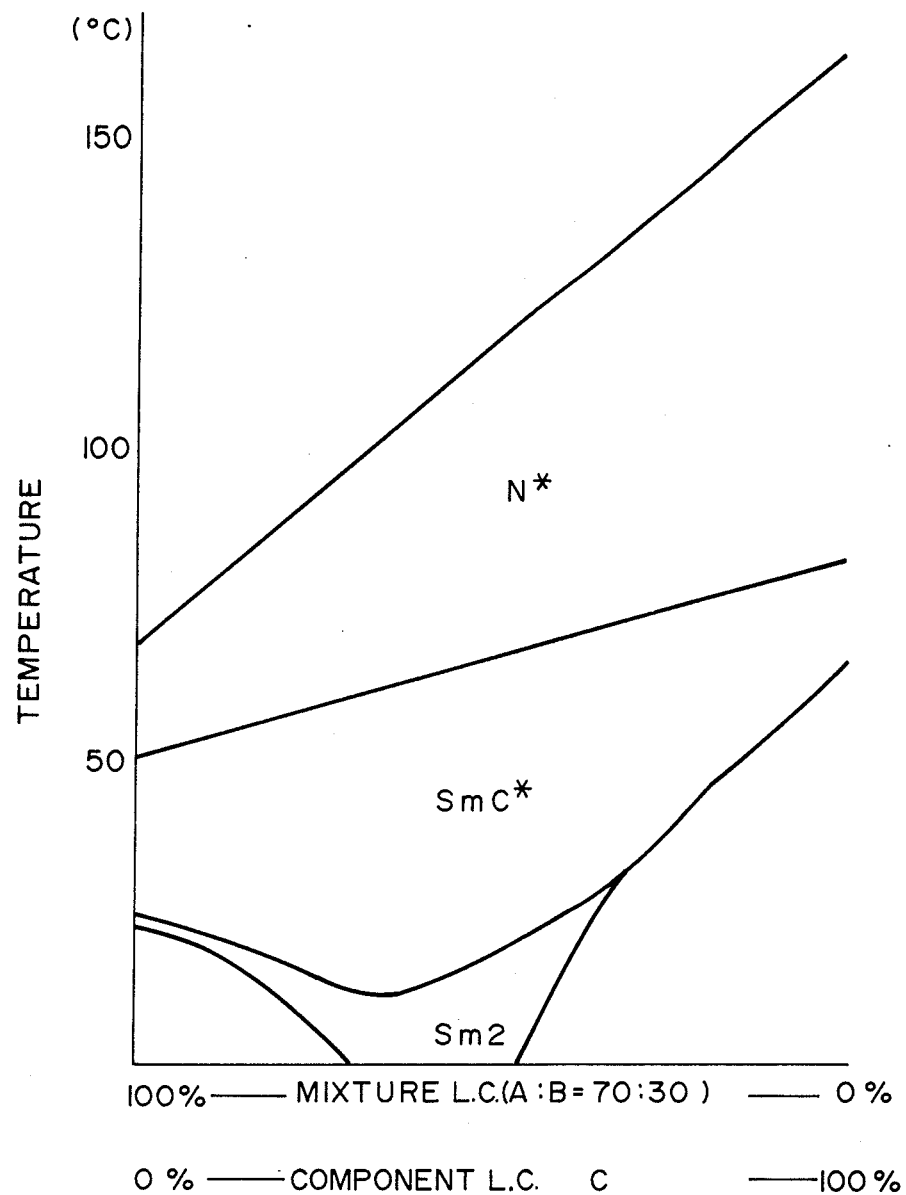
F I G. 1

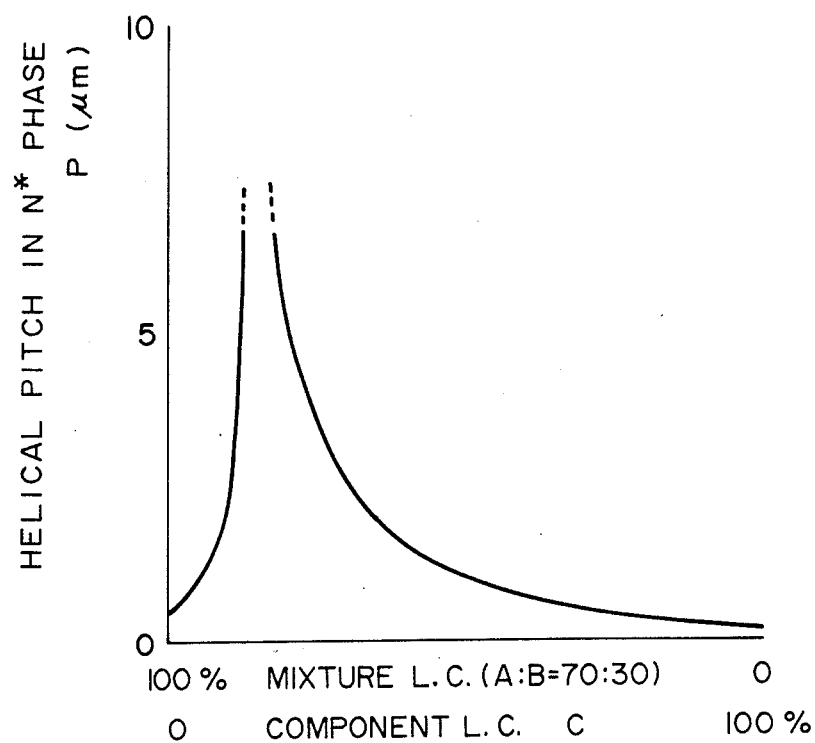
F I G. 2

FERROELECTRIC LIQUID CRYSTAL DEVICE

FIELD OF THE INVENTION AND RELATED ART

This invention relates to a liquid crystal device to be used in a liquid crystal display device or a liquid crystal-optical shutter, etc., particularly a liquid crystal device by use of a ferroelectric liquid crystal, more particularly to a liquid crystal device improved in display characteristics through improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107217/1981, U.S. Pat. No. 4,367,924). The ferroelectric liquid crystal has generally chiral smectic C phase (SmC*) or H phase (SmH*) and, under this state, shows a property of taking either one of a first optically stable state and a second optically stable state responding to an electrical field applied and maintaining such state in the absence of an electrical field, namely bistability, and also has a rapid response to the change in electrical field. Thus, it is expected to be utilized in a high speed and memory type display device.

For an optical modulating device by use of a liquid crystal having such bistability to exhibit desirable driving characteristics, it is required that the liquid crystal arranged between a pair of substrates should be in such a molecular alignment state that conversion between the above two stable states may occur effectively irrespective of the application of an electrical field. For example, for a ferroelectric liquid crystal having SmC* or SmH* phase, it is necessary to form a domain (monodomain) in which the liquid crystal molecular layers having the SmC* or SmH* phase are arranged perpendicular to the substrate surfaces, and therefore the liquid crystal molecular axes are arranged in substantially parallel to the substrate surfaces.

As a method for orientation or alignment control of such a ferroelectric liquid crystal, it has been known to provide a substrate surface constituting an inner surface of a liquid crystal cell with an ability of orientating molecules by forming an organic film or inorganic paper deposition film with a physical scratch on the substrate surface thereof through the use of the rubbing method or the oblique vapor deposition method as has been excercised in conventional TN-type liquid crystal device apparatus. For example, the rubbing method is a method wherein transparent electrodes are formed on a glass substrate and coated with an organic polymer film which is then rubbed with a cloth such as velvet in one direction to be provided with surface scratches having a function of aligning liquid crystal molecules. The oblique vapor deposition method is a method wherein a film of an inorganic material such as SiO instead of an organic polymer film is formed by oblique vapor deposition, i.e., vapor deposition onto an inclined substrate.

As an alignment system unique to ferroelectric liquid crystals, there have been known a method of applying a shearing force to liquid crystal molecules by mutually sliding a pair of glass plates sandwiching the liquid crystal, a technique wherein a polyethylene terephthalate sheet is used as a spacer for setting a cell gap and also an alignment member through utilization of an orientating characteristic of the spacer edges, etc. U.S. Pat. No. 4,639,089 also describes about an orientation or alignment control film for a ferroelectric liquid crystal device.

It has been generally known that a ferroelectric liquid crystal which can be uniformly aligned relatively easily by using the above described methods is one having smectic A phase on a higher temperature side than a ferroelectric liquid crystal phase (chiral smectic C phase). In contrast thereto, it is difficult to obtain a sufficiently and satisfactorily uniform alignment state with a ferroelectric liquid crystal (hereinafter sometime abbreviated as "FLC") not having smectic A phase as compared with one having smectic A phase.

On the other hand, an FLC material showing a phase transition series of Iso→N*→SmC* (Iso*: isotropic phase, N*: chiral nematic phase, and SmC*: chiral smectic phase) on temperature decrease has excellent characteristics such that it shows an excellent temperature characteristic and it provides a large tilt angle from the direction of a normal to a smectic layer of liquid crystal molecules than an FLC material having smectic A phase, but it has been difficult to obtain a uniform alignment thereof in a large area.

SUMMARY OF THE INVENTION

Accordingly, an object of the present invention is to provide an FLC device (ferroelectric liquid crystal device) with improved display characteristics through realization of a monodomain with a uniform initial alignment state, particularly an FLC device with such characteristics using a liquid crystal composition which causes a phase transition of from isotropic phase (Iso) through chiral nematic phase (N*) to chiral smectic C phase (SmC*).

A more specific object of the present invention is to provide an FLC device showing a uniform monodomain alignment based on consideration of a helical pitch in the N* phase as the uniform alignment characteristic in SmC* phase of a liquid crystal having a phase transition series of Iso→N*→SmC*.

According to the present invention, there is provided a ferroelectric liquid crystal device comprising a pair of substrates and an FLC showing a phase transition of Iso→N*→SmC* on temperature decrease; the pair of substrates having, on the surfaces thereof contacting the FLC, alignment control films which comprise mutually different materials.

In the present invention, it is possible to provide a particularly uniform alignment state in SmC* when a ratio (p/d) of the helical pitch (p) in N* to the cell gap (d) of the liquid crystal device is 3 or more.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 4 are respectively a phase diagram of a mixture liquid crystal composition based data obtained in the course of temperature increase;

FIGS. 2 and 5 are respectively a graph showing a relationship between a N*-helical pitch and a content of liquid crystal C in a mixture liquid crystal composition;

DETAILED DESCRIPTION OF THE PREFERRED EMBODIMENTS

Figures 3A, 3B:
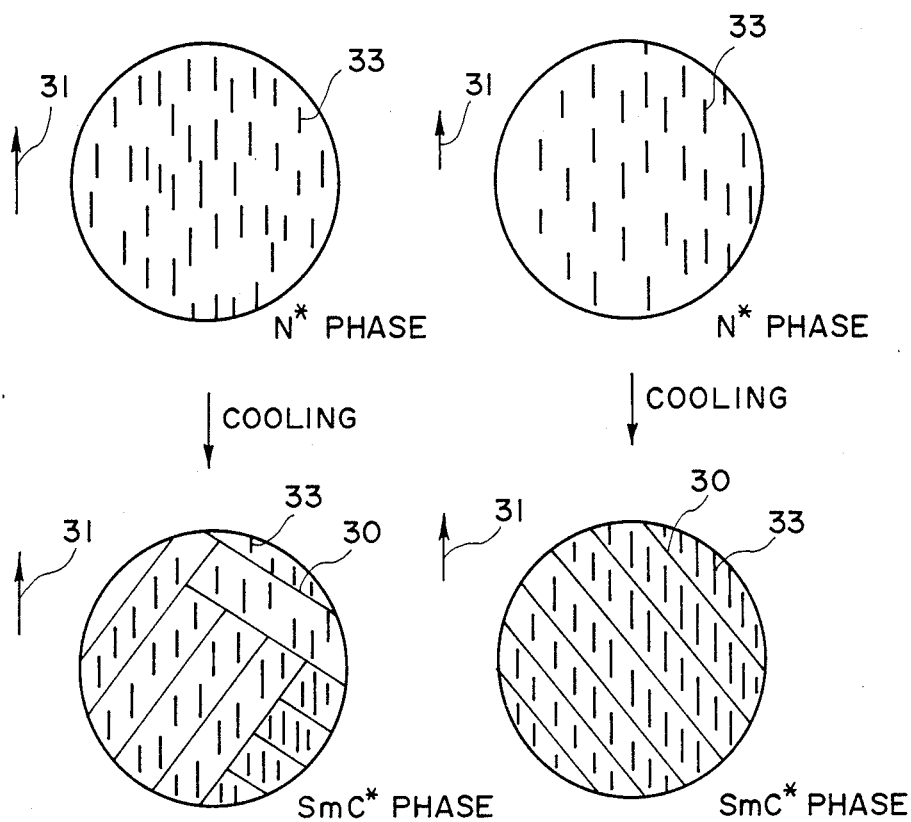
FIGS. 3A and 3B are schematic views for illustrating alignment states.

FIGS. 3A and 3B are schematic views for illustrating alignment states of a liquid crystal composition showing a phase transition of Iso→N*→SmC*. FIG. 3A illustrates alignment states in a case where both substrate surfaces are covered with alignment control films of the same type and FIG. 3B illustrates alignment states in a case where alignment films of different types.

Lines 33 represent liquid crystal molecules which are aligned in a direction 31 of a uniaxial orientation treatment in N* phase and, on temperature decrease, transformed into SmC phase having smectic layers 30. In the SmC phase, the smectic layers 30 assume two directions when both alignment control films are formed of the same material as shown in FIG. 3A, whereas the smectic layers 30 assume one direction as shown in FIG. 3B.

Figure 6:
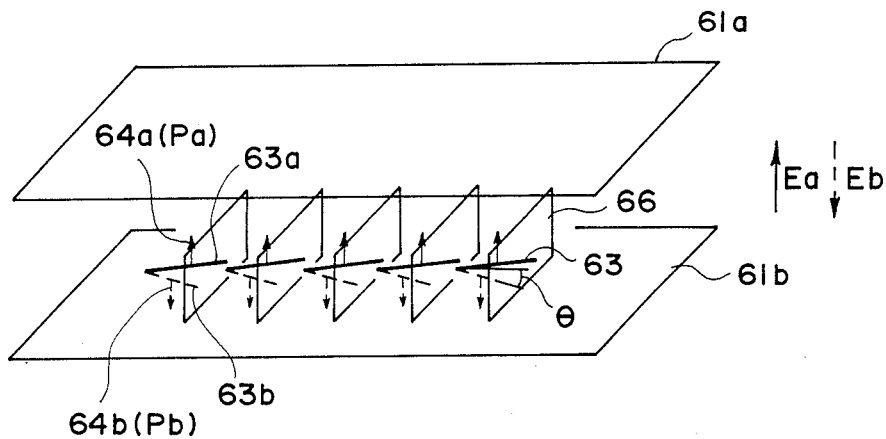
FIG. 6 is a schematic perspective view illustrating a liquid crystal device using a ferroelectric liquid crystal in a non-helical structure.

Further, FIG. 6 schematically illustrates an FLC device showing at least two stable states, particularly bistable states, in the absence of an electric field. Substrates (glass plates) 61a and 61b are coated with transparent electrodes of $In_2O_3$, $SnO_2$ or ITO (Indium Tin Oxide), etc., and a liquid crystal of SmC* (chiral smectic C phase) is hermetically disposed therebetween so that a plurality of liquid crystal molecular layers 66 are aligned perpendicular to the glass substrates. Full lines 63 show liquid crystal molecules each having a dipole moment (P⊥) 64 in a direction perpendicular to the extension thereof.

In a case where the helical structure of liquid crystal molecules are unwound and the molecules assume a non-helical structure under no electric field as shown in FIG. 6, the dipole moment of a liquid crystal molecule 63 assumes either Pa directed upward (64a) or Pb directed downward (64b), thus forming a bistable state. When an electrical field Ea or Eb with different polarity exceeding a certain threshold value is applied to such a cell as shown in FIG. 6, the dipole moment will change its direction upwardly 64a or downwardly 64b corresponding to the electrical field vector Ea or Eb, whereby the liquid crystal molecules become oriented to either one of the first state state 63a or the second stable state 63b, correspondingly. A half of the angle formed between the first and second stable states corresponds to a tilt angle θ.

When both alignment control films formed on the substrate surfaces 61a and 61b are of the same type, the alignment control films have no difference in force of attracting the spontaneously polarization of an FLC molecule, so that an FLC molecule can assume either of the first stable state 63a and the second stable state at equal probability. Thus, it is possible that liquid crystal molecular layers assume two directions as shown in FIG. 3A.

In contrast thereto, when the alignment control films are of different types, they have inherently different forces of attracting the spontaneous polarization of an FLC molecule so that an FLC molecular is oriented to assume a particular one of the first stable state (63a) or the second stable state. More specifically, if a cell is viewed from above, each liquid crystal molecular is inclined definitively on one side with respect to a smectic layer so that liquid crystal molecular layers are uniformly oriented in one direction.

Specific examples of materials for the alignment control films to be used in the present invention may include polyimide, polyvinyl alcohol, polyethylene, polyamide-imide, polyester-imide, polyparaxylylene, polyester, polyamide, cellulose resin, acrylic resin, and silane coupling agents (such as KBM 602 (N-(β-aminoethyl)-γ-aminopropylmethyldimethoxysilane), KBM 603 (N-(β-aminoethyl)-γ-aminopropyltrimethoxysilane) and KBE 1003 (vinyltriethoxysilane), respectively available from Shinetsu Kagaku Kogyo K.K.).

Examples of the combination of the above materials may include: polyimide-silane coupling agent, polyvinyl alcohol-silane coupling agent, polyimide-polyethylene, polyimide-polyvinyl alcohol and polyamide-cellulose resin.

Further, in the present invention, the pair of alignment control films can be treated differently, e.g., one with oblique vapor deposition and the other with rubbing treatment, or one with a homogeneous orientation treatment and the other with perpendicular orientation treatment.

In a preferred embodiment, the helical pitch (p) in N* phase is made three or more times the cell gap (d) to provide a uniform alignment state. This is because, the alignment state in SmC* phase is determined in the stage of transformation of N* phase into SmC* phase under cooling, and if the N* helical pitch (p) is less than three times the cell gap (d), the transformation from N* into SmC* proceeds while molecular axes of N* liquid crystal are twisted with respect to a normal of the substrate, so that the resultant SmC* phase is strained. As a result, under such a condition, it is difficult to obtain a uniform alignment state.

In view of the above, the N* helical pitch (p) and the cell gap (d) are set to satisfy $p \geq 3d$, so that twisting of N* molecular axes is removed, the molecular axes are aligned in the direction of a uniaxial orientation treatment, and the liquid crystal is transformed into SmC* phase while retaining the uniaxial alignment characteristic. As a result thereof, a uniform laminar structure is realized to form an alignment state providing good driving characteristics inclusive of contrast. In order to ensure a uniform alignment and other advantages such as a high response speed, the cell gap (d) is preferably 1-20 microns, more preferably 1-10 microns.

The present invention described below while referring to specific Examples and Comarative Examples wherein mixing ratios in mixture liquid crystal are all by weight.

EXAMPLE 1

Three liquid crystal cells were prepared by changing alignment control films formed on a pair of substrates (substrates 1 and 2) and with substantially the same cell gap as follows.

Liquid crystal cell ①:
Substrate 1: 500 Å-thick polyimide film, rubbing;
Substrate 2: 50 Å-thick coating of silane coupling agent;
Cell gap: 2.0 microns
Liquid crystal cell ②:
Substrate 1: 800 Å-thick polyvinyl alcohol film, rubbing;
Substrate 2: 150 Å-thick coating of silane coupling agent;
Cell gap: 2.0 microns
Liquid crystal cell ③:
Substrate 1: 200 Å-thick polyimide film, rubbing;

Substrate 2: 100 Å-thick polyethylene film;
Cell gap: 1.8 microns

The above alignment control films were prepared by using the following commercially available materials.

Polyimide: SP-510, available from Toray K.K.
Silane coupling agent: KBM 602, available from Shinetsu Kagaku Kogyo K.K.
Polyethylene: Nipolon Hard 1200, available from Toyo Soda Kogyo K.K.
Polyvinyl alcohol: EG 25, available from Nippon Gosei Gomu K.K.

It is generally preferred to form an alignment control film in a thickness of 50 Å to 1000 Å by using a spinner coater.

Liquid crystal compositions were prepared by mixing the following three liquid crystal compounds.

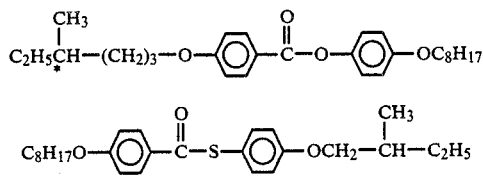

A

B

C

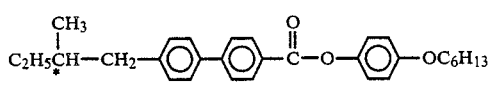

More specifically, a mixture liquid crystal was first prepared by mixing the above compounds A and B in a proportion of A:B=70:30, and liquid crystal compositions were prepared by mixing the mixture liquid crystal with different proportions of the compound C. The liquid crystal compositions were respectively charged in the liquid crystal cells ①, ② and ③.

FIG. 1 shows a phase diagram of liquid crystal compositions comprising mixtures of the three compounds A, B and C. In all mixing ratios, the liquid crystal compositions showed an enantiotropic phase transition characteristic. As a representative example, the phase transition temperature (°C.) of a liquid crystal composition obtained by mixing the mixture liquid crystal (A:B=70:30) and the component liquid crystal C in a proportion of 85:15 as shown hereinbelow.

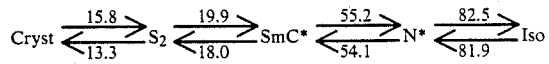

wherein $S_2$ (or Sm2) denotes a smectic phase (unidentified) other than SmA and SmC.

FIG. 2 shows a relationship between the N* helical pitch and the mixing ratio of the mixture liquid crystal with the compound C in the above series. It is understood from FIG. 2 that the helical pitch diverges at a mixing ratio of around 85:15. Then, alignment characteristics were examined at three mixing ratios of 90:10, 85:15, and 50:50.

More specifically, the liquid crystal compositions having the mixing ratios of 90:10, 85:15, 80:20 and 50:50 were respectively charged at a temperature of isotropic phase into the above cells, and after cooling, the alignment states in SmC* phase were observed through a polarizing microscope at a magnification of 40. Further, in order to quantitatively evaluate the alignment states, the contrast of each cell was measured in terms of a ratio of transmitted light quantity through a cross nicol-polarizing microscope under application of voltages of 100 Hz and ±20 volts between the substrates. The results are summarized in the following table.

| N* Mixing ratio (mixture: C) | 2 μm 90:10 | 750 μm 85:15 | 5 μm 80:20 | 1 μm 50:50 |
| --- | --- | --- | --- | --- |
| Cell ① | Many domains and displacement of smectic layers were observed. | Uniform alignment | Uniform alignment | Focal-conic texture. No uniaxial characteristic. |
| contrast | (1:5) | (1:20) | (1:15) | (—) |
| Cell ② | Focal-conic texture. No uniaxial characteristic. | Uniform alignment | Displacement of smectic layers | Focal-conic texture. No uniaxial characteristic. |
| contrast | (—) | (1:16) | (—) | (—) |
| Cell ③ | Displacement of smectic layers was observed. | Uniform alignment | Displacement of smectic layers | Focal-conic texture. |
| contrast | (1:7) | (1:20) | (—) | (—) |

As is understood from the above results, it was clarified that the liquid crystal composition which was obtained by mixing the mixture (A:B=70:30) and the component liquid crystal C in a ratio of 85:15 and showed a divergent pitch in N* phase gave the best result in providing a uniform alignment.

As a result of further experiments, it was confirmed that a mixing ratio in the range of 85±3:15∓3 providing a N* pitch of N* of above 6 microns gave a good alignment characteristic and a good contrast for all the cells ①-③. In the case of a mixing ratio of 80:20 (providing N* pitch of 5 microns), uniform alignment was attained only in the cell ①.

EXAMPLE 2

Liquid crystal compositions were prepared by mixing the above liquid crystal compounds B and C and also the following liquid crystal compound D:

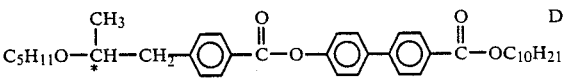

D

Figure 4:
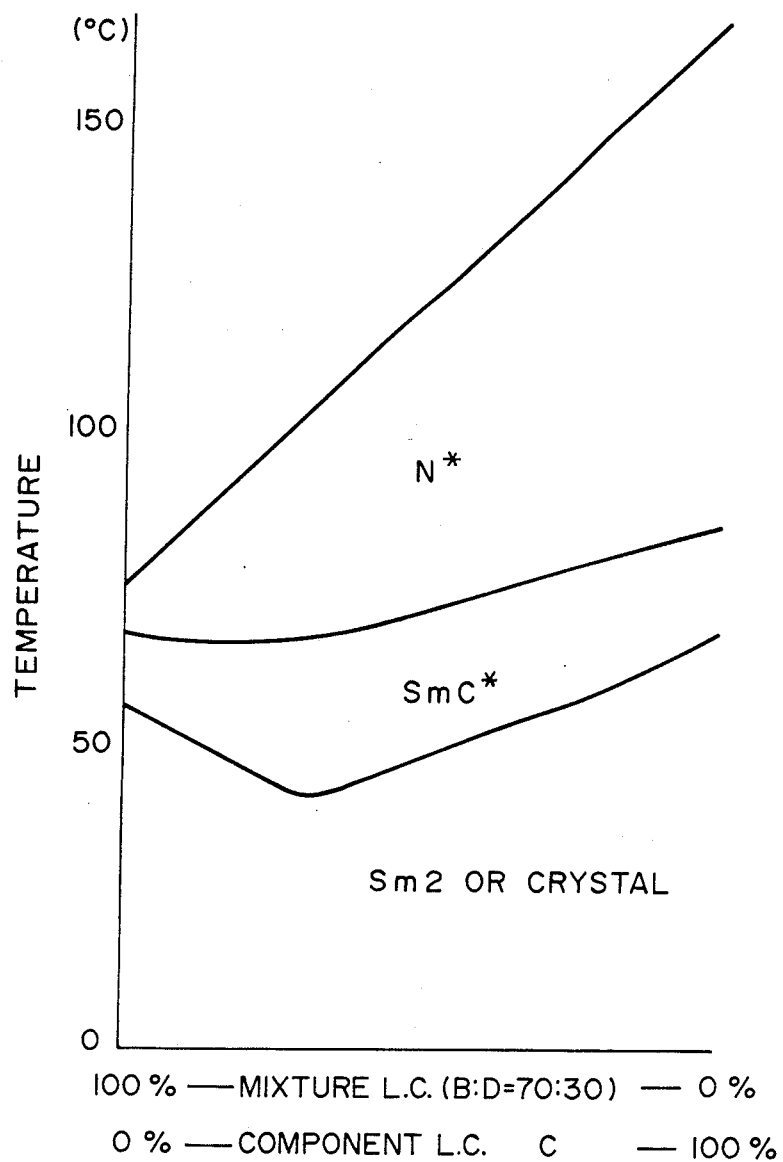
Figure 5:
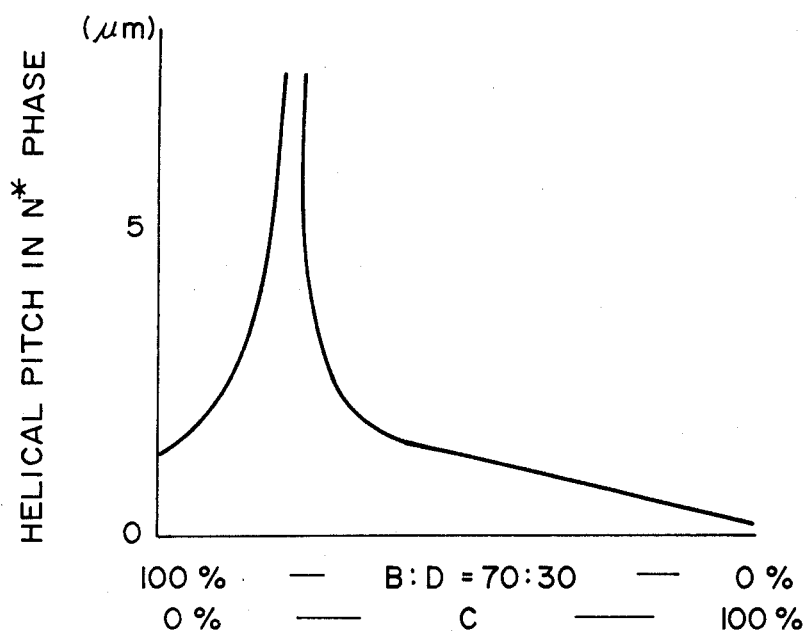

More specifically, a mixture liquid crystal of B:D=70:30 was first prepared and the mixture liquid crystal was mixed with various proportions of the liquid crystal compound C to provide liquid crystal compositions. FIG. 4 shows a phase diagram of the liquid crystal compositions, and FIG. 5 shows a relationship between the N* helical pitch and the mixing ratio of the mixture liquid crystal with the compound C.

As a representative example, the phase transition temperatures (°C.) of a liquid crystal composition obtained by mixing the mixture liquid crystal (B:D=30) and the compound C in a proportion of 80:20 are shown hereinbelow:

As a result of microscopic observation conducted in the same manner as in Example 1, the results shown in the following table were obtained.

| N* pitch Mixing ratio (mixture: C) | 3 μm 90:10 | >50 μm 80:20 | 5 μm 70:30 | 4 μm 50:50 |
| --- | --- | --- | --- | --- |
| Cell ① | Focal-conic texture | Uniform alignment | Uniform alignment | Focal-conic texture |
| contrast | (—) | (1:23) | (1:17) | (—) |
| Cell ② | Displacement of layers observed many defects. | Uniform alignment | Focal-conic texture | Focal-conic texture |
| contrast | (1:8) | (1:19) | (—) | (—) |
| Cell ③ | Focal-conic texture | Uniform alignment | Focal-conic texture | Focal-conic texture |
| contrast | (—) | (1:16) | (—) | (—) |

Uniform alignment was attained for all the cells ①-③ in the mixing ratio range of the mixture liquid crystal (B:D=70:30): the liquid crystal compound C of 78±3%: 22∓3% providing N* pitch of above 6 microns. In the case of mixing ratio of 70:30 providing N* pitch of 5 microns, uniform alignment was attained only in the cell ①, and the cells ② and ③ showed focal-conic texture.

COMPARATIVE EXAMPLES 1, 2

Liquid crystal cells 4 and ⑤ were prepared in the same manner as the preparation of the liquid crystal cells ①-③ except that both alignment control films were rubbing-treated polyimide films in the cell ④ and rubbing treatment polyvinyl alcohol films in the cell ⑤. Then, into the cells ④ and ⑤, the liquid crystal composition I (mixture liquid crystal (A:B=70:30): compound C=85:15) having shown a good alignment characteristic in Example 1 and the liquid crystal composition II were respectively charged, and the resultant four cells were evaluated in the same manner as in Examples 1 and 2. The results are summarized in the following table.

| Composition | I | II |
| --- | --- | --- |
| Cell 4 | State shown in FIG. 3A | State shown in FIG. 3A |
| contrast | (—) | (—) |
| Cell 5 | State shown in FIG. 3A | State shown in FIG. 3A |
| contrast | (—) | (—) |

As described above according to the present invention, there is provided a good alignment state for an FLC material showing a phase transition series of Iso→N*→SmC*, whereby a ferroelectric liquid crystal device having good display and driving characteristics is provided.

What is claimed is:

1. A ferroelectric liquid crystal device, comprising a pair of substrates, and a ferroelectric liquid crystal composition sandwiched between the substrates and showing a phase transition from isotropic phase through chiral nematic phase to chiral smectic C phase in the course of temperature decrease; the pair of substrates having, on the surfaces thereof contacting the ferroelectric liquid crystal composition, alignment control films which comprise mutually different materials.

2. A device according to claim 1, wherein at least one of the alignment control films has been subjected to a uniaxial orientation treatment.

3. A device according to claim 2, wherein said uniaxial orientation treatment is rubbing.

4. A device according to claim 1, wherein said ferroelectric liquid crystal shows at least two stable states in the absence of an electric field.

5. A device according to claim 1, wherein said liquid crystal composition provides a helical pitch (p) in the chiral nematic phase and the pair of substrates are disposed to have a spacing (d) therebetween satisfying the relation of p/d≧3.

6. A device according to claim 1, wherein at least one of the alignment control films comprises a film of a resin selected from the group consisting of polyimide, a silane coupling agent, polyvinyl alcohol, polyethylene, polyamide, and cellulose resin.

7. A device according to claim 1, wherein one of the alignment control films comprises polyimide and the other comprises a silane coupling agent.

8. A device according to claim 1, wherein one of the alignment control films comprises polyvinyl alcohol and the other comprises a silane coupling agent.

9. A device according to claim 1, wherein one of the alignment control films comprises polyimide and the other comprises polyethylene.

10. A device according to claim 1, wherein one of the alignment control films comprises polyvinyl alcohol and the other comprises polyvinyl alcohol.

11. A device according to claim 1, wherein one of the alignment control films comprises polyamide and the other comprises cellulose resin.

* * * * *